Sept. 30, 1958
C. E. KEIM
2,854,076
CIRCLE CUTTING ATTACHMENT
Filed Aug. 29, 1955
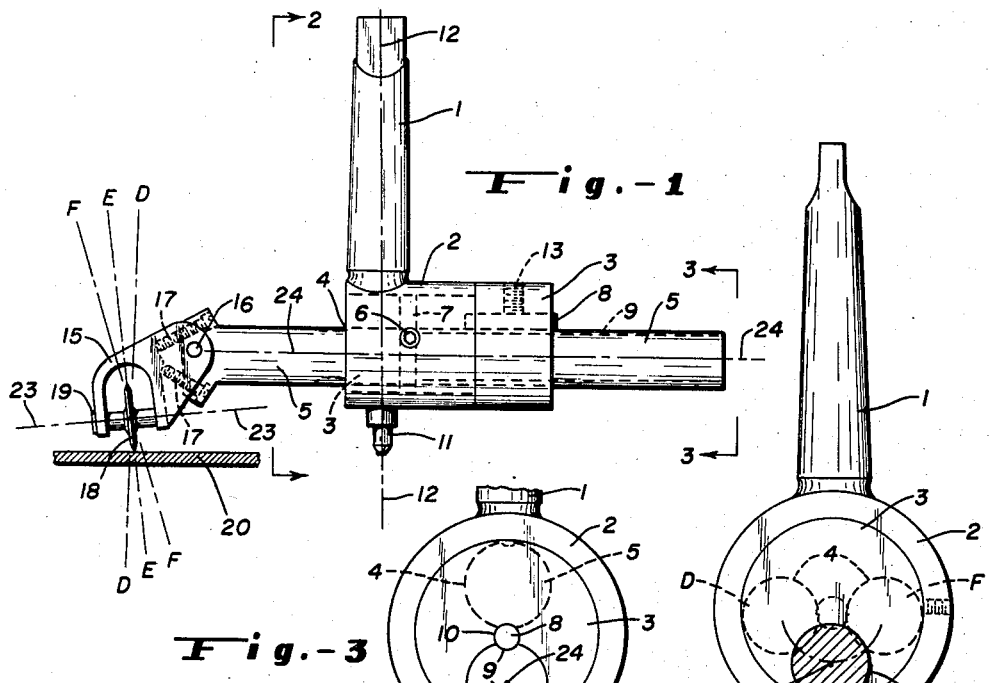
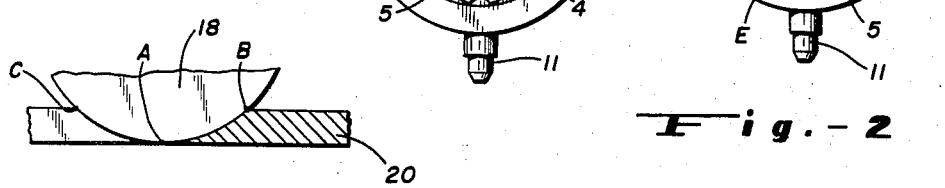
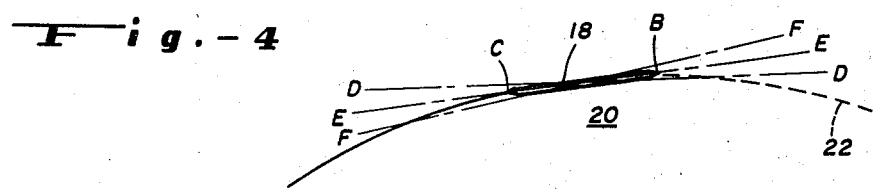
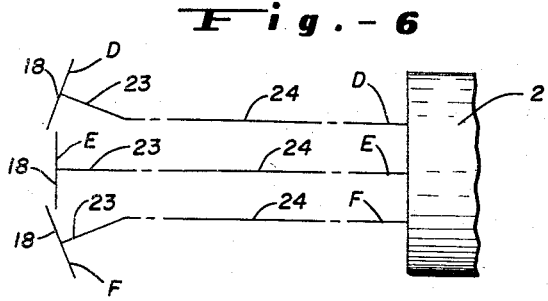
INVENTOR.
Charles E. Keim
BY
ATTORNEYS

United States Patent Office 2,854,076
Patented Sept. 30, 1958

2,854,076
CIRCLE CUTTING ATTACHMENT
Charles E. Keim, Denver, Colo.
Application August 29, 1955, Serial No. 531,184
6 Claims. (Cl. 164—71)

This invention relates to devices for cutting circles in rigid sheet material, and more particularly this device is arranged to cut various sizes of holes in sheet metal and similar material, and includes means for providing an adjustable cutting angle for producing maximum efficiency of cutting various sizes of circles with a single cutter.

Various types of circle or washer cutters which are adapted to be connected with a drill press or similar type mechanism are well known in the prior art. Such cutters utilize a spindle which is to be connected in the chuck or other clamping device of the rotating mechanism. A traverse bar is interconnected with the spindle and laterally to the rotating axis thereof, and a disc cutter is secured to the traverse bar. The disc cutter on the traverse bar and/or the traverse bar in its holder is adjustable to vary the radius of the circle to be cut. Since it is not likely that one machine will be used exclusively to cut circles of the same diameter, it is imperative to have the cutting discs laterally adjustable in relation to the spindle. All the prior art devices which had laterally adjustable cutters, however, were provided with a fixed head, that is, the angle of the cutter shaft in relation to the plane of the work piece was fixed. The fixed head does not permit efficient cutting of all sizes of circles, and does not permit a variation of the type of cut. The angle of the cutter shaft in relation to the plane of the work piece determines the angle at which the cutter blade contacts the sheet metal, and this contact angle changes as the diameter of the circle changes.

In the prior art devices with the fixed head, the changing of the diameter of the circle to be cut changes the contact angle of the cutter with the work. The fixed angle of the prior art cutter discs were optimum for only one particular diameter of circle being cut, and changing the diameter of that circle caused the cutter to bind on one side or the other against the work piece. The binding of the cutter on the work piece increases the friction, heating the cutter and decreasing the tool life. Furthermore, it was immaterial whether the piece desired was the inside circle or the outside piece with a circular hole, the cut was the same and could not be varied. For example, if the circle was the desired piece and a vertical cut edge was required, further machining of the circular piece had to be done to obtain the vertical edge.

Included among the objects and advantages of the present invention is a circle cutting device arranged to be mounted on a drill press or similar mechanism which provides an adjustable angle cutter, in which the angle of the cutter axis of rotation in relation to the plane of the work piece can be readily adjusted to accommodate any of the particular circles being subscribed by the cutter, and which produces efficient and effective cutting. By providing the most efficient cutting angle of the cutter, the tool life of the cutter is greatly extended. Furthermore, by having a readily changeable adjustment for the angle of the cutter in relation to the work, the final results of the cutting can be changed to produce the desired piece.

These and other objects and advantages of the invention may be readily ascertained by referring to the following description and illustrations in which:

Fig. 1 is a side elevational view of a cutter according to the invention;

Fig. 2 is a partial cross sectional elevation taken along section line 2—2 of Fig. 1;

Fig. 3 is a partial end elevation of the device of Fig. 1 taken along lines 3—3;

Fig. 4 is a partial cross sectional view of a cutter in operation cutting a piece of sheet material;

Fig. 5 is a schematic view of the line of contact of a cutter in operative position following a circular line of cut; and Fig. 6 is a schematic view of the operating positions of a cutter according to the invention.

In the device illustrated in Fig. 1, the cutter includes a spindle 1 which is adapted to be supported in a chuck or similar clamping device for rotating the cutter of the invention. Secured to the lower end of the spindle is an annular traverse rod holder 2. A rod support 3, rotatably mounted in the holder 2, has an eccentric opening 4 for a traverse rod 5 mounted therein. The traverse rod support 3 telescopes in the holder and is retained therein by means of a set screw 6 which rides in a groove 7 on the inner end of the support 3. The traverse rod 5 is secured against rotation in the support 3 by means of a circular key 8, which fits in a keyway 9 in the traverse rod 5 and in a keyway 10 in the support 3. A centering pin 11 is mounted on the lower portion of the holder 2 along the axis of rotation 12 of the device. The key is retained in place by means of set screw 13.

The cutter head includes a bifurcated disc holder 15 pivotally mounted by means of a pin 16 on the end of the rod 5. A pair of set screws 17 on either side of the pin 16 are arranged to hold the bifurcated holder in position on the rod. A disc cutter 18 is mounted on a shaft 19 which has an axis of rotation 23 for the disc. The cutter 18 is mounted so as to cut a circle out of a sheet material piece 20, which is clamped to a work table.

The cutting action of the cutter 18 is illustrated in detail in Fig. 4. Since the lateral profile of a cutter is planar, and since the distance between the points C and B is substantial even on relatively thin sheet metal pieces, the angle of the profile of the cutter in relation to the work piece plays an important factor in the cutting of a circle from the piece. The best theoretical practice is illustrated in Fig. 4 where the tangential point A just extends through the thickness of the sheet metal so that the distance between C—B is minimum. In actual practice, however, the blade 18 will extend a short distance through the metal increasing the distance between the points C and B. The leading edge of the cutter between points A and B is the actual cutting distance on the circumference of the cutter, and the trailing edge between A and C follows the cut in the metal. Since the cutter cuts a circle there must be contact between the edge C—A and one side of the cut in the work. The angle at which the blade contacts the work is important in reducing the area of this contact, thereby reducing the friction between the cutter blade and the work.

The angle of contact of the cutter, as indicated in Fig. 5, and the work can be varied as indicated in the lines D, E and F. If the support 3 is rotated in holder 2 so that the cutter 18 is turned whereby its line of contact extends along line D in relation to the proposed circle 22, the cutting line A to B will follow closely along the proposed cutting line 22 but the trailing edge A—C will bind strongly against the outside of the cut, increasing the friction and heating the cutter. Likewise, by turning the cutter so that its line of contact is along line F—F, the front edge of A—B of the cutter tends to bind along the outside of the work 20 while the trailing edge A—C binds against the inner edge of the cut, further increasing the friction of the cutter. Along line E—E the cutter is about equally distributed in the binding of the cutting edge A—B and the trailing edge A—C. As the diameter of the circle 22 changes, the angle at which the cutter produces its optimum cutting properties will vary. Furthermore, if it is desired to have a vertical cut on either the inner circle or the outer piece a different type of cut will have to be made.

The change in angle of the cutter blade can be readily adjusted by rotating the support 3 in the holder 2. This is easily accomplished by releasing the set screw 6 which permits the support to turn in the holder. By turning the support in the holder, the eccentric hole 4 is moved to various positions, and the shaft 5 is turned. Since the rod 5 is keyed into the support 3 it will turn with the turning of the support 3, so that the angle of the head and the cutter changes. The positions of the support and the shaft in the holder are indicated in Fig. 2, the lower position is indicated as E, the upper right is indicated as F and the upper left indicated as D. In Fig. 6 the angle of the cutter in relation to the rod is schematically shown, caused by the change in position of the rod 5 in the holder 2. At position E, Fig. 2, the angle of the cutter 18 is substantially at the E position in Fig. 6, but by rotating the support 3 around to the position D, the cutter angle is changed to that indicated by position D. Likewise, by rotating the position of the holder to position F, Fig. 2, the cutter head is moved to position F, Fig. 6, which is a reverse angle to that of position D. To be able to change the angle of the cutter, however, the axis of rotation 23 of the cutter must not be parallel to the axis of rotation 24 of the rod 5. The net effect of rotation of the cutter shaft is to change its angle of contact in relation to the circular path on which the cutter is traveling.

The support 3 may be rotated 180 degrees to the position indicated in dashed lines in Fig. 3, where the rod 4 is in the uppermost position. The rod 5 must be rotated 180 degrees to place the cutter in down position. The cutting edge of the cutter is, thereby, raised in relation to the axis of the holder 2. In this position, the centering pin 11 is substantially below the cutting edge so that a centering hole in the work may be used. Where a centering hole is not desired, as for example, where the circle is the piece desired, the rod 5 is placed in the lowermost position, solid lines of Fig. 3, so that the centering pin is above the top surface of the work when the cutting edge of the cutter is below the lower surface of the work.

While the invention has been illustrated by reference to a particular embodiment, there is no intent to limit the scope and spirit thereof to the precise details so described, except insofar as set forth in the following claims.

I claim:

1. A circle cutter for sheet material comprising a work centering element, spindle means for rotating a cutter around said centering element, a cylindrical housing mounted with its axis lateral to said spindle, a tool holder rotatably mounted in said housing, a tool shaft mounted in said holder and eccentrically positioned with respect to the axis of said tool holder, and a disc cutter rotatably mounted on said tool shaft with its axis of rotation in non-alignment and non-parallel relation with the axis of said tool shaft, whereby rotation of said tool holder in said housing varies the angle of contact of said cutter in relation to its circular path.

2. A circle cutter for sheet material comprising a cylindrical housing, a spindle mounted above said housing with its axis normal to the axis of said housing, a work centering element depending below said housing and axially aligned with said spindle, a tool holder rotatably mounted in said housing, a tool shaft mounted in said holder and eccentrically positioned with respect to the axis of said tool holder, and a disc cutter rotatably mounted on said tool shaft with its axis of rotation in non-alignment and non-parallel relation with the axis of said tool shaft, whereby rotation of said tool holder in said housing varies the angle of contact of said cutter in relation to its circular path.

3. A circle cutter for sheet material comprising an annular housing, a spindle depending upwardly from said housing with its axis normal to the axis of said housing, a tool holder rotatably mounted in said housing, means for detachably securing said holder in said housing, a circular tool shaft mounted in said holder and eccentrically positioned with respect to the axis of said tool holder, and a disc cutter rotatably mounted on one end of said tool shaft with its axis of rotation in non-alignment and non-parallel relation with the axis of said tool shaft, whereby rotation of said tool holder in said housing varies the angle of contact of said cutter in relation to its circular path.

4. A circle cutter for a drill press and like rotary mechanisms comprising in combination a spindle arranged to be mounted on a rotary mechanism, an annular housing mounted on said spindle, a cylindrical tool holder rotatably mounted in said housing, a cutter supporting shaft mounted in said tool holder and eccentrically positioned with respect to the axis of said tool holder, a disc cutter mounted on said shaft with its axis of rotation in non-alignment with and at an acute angle to the longitudinal axis of said shaft, means arranged to releasably secure said tool holder in position in said housing whereby to change the angle of the axis of the cutter in relation to its circular cutting path and thereby change its angle of cut, and a work centering member supported downwardly from said housing.

5. A circle cutter for a drill press and like rotary mechanisms comprising in combination a spindle arranged to be mounted on a rotary mechanism, an annular housing mounted on one end of said spindle, a cylindrical tool holder rotatably mounted in said housing, a cutter supporting shaft telescoped in said tool holder and eccentrically positioned with respect to the axis of said tool holder so as to provide lateral movement thereof in relation to said spindle, a disc cutter mounted on one end of said shaft with its axis in non-aligned position with and at an acute angle to the longitudinal axis of said shaft, means arranged to releasably secure said tool holder in position in said housing whereby to change the angle of the axis of the cutter in relation to its circular cutting path and thereby change its angle of cut, and a work centering member supported downwardly from said housing along the axis of said spindle.

6. A circle cutter for a drill press and like rotary mechanisms comprising in combination a vertically disposed spindle arranged to be mounted on a rotary mechanism, an annular housing mounted on one end of said spindle with its axis normal to the axis of said spindle, a cylindrical tool holder rotatably mounted in said housing, a cutter supporting shaft telescoped in said tool holder and eccentrically positioned with respect to the axis of said tool holder and arranged to be laterally movable in relation to said spindle so as to vary the diameter of cut of said cutter, a bifurcated head pivotally mounted on one end of said shaft, a circular disc cutter mounted in said head with its axis in non-aligned position with and at an acute angle to the longitudinal axis of said shaft, means adjustably securing said head in position on said shaft, means arranged to releasably secure said tool holder in position in said housing whereby to change the angle of the axis of the cutter in relation to its circular cutting path and thereby change its angle of cut, and a work centering member supported downwardly from said housing along the axis of said spindle.

References Cited in the file of this patent

UNITED STATES PATENTS

| | | |
|---|---|---|
| 181,633 | Brown | Aug. 29, 1876 |
| 194,289 | Buckingham | Aug. 21, 1877 |
| 884,556 | Bauer | Apr. 14, 1908 |
| 2,554,027 | Haswell | May 22, 1951 |
| 2,587,732 | Jaeger | Mar. 4, 1952 |
| 2,693,853 | Bushnell | Nov. 9, 1954 |